United States Patent [19]
Sheehan

[11] 3,921,825
[45] Nov. 25, 1975

[54] BAG-TURNING STACKING PALLETIZER

[76] Inventor: Robert T. Sheehan, 14180 Shadywood, Plymouth, Mich. 48170

[22] Filed: Nov. 12, 1970

[21] Appl. No.: 88,569

[52] U.S. Cl. .............. 214/6 P; 214/6 DK; 214/6 G
[51] Int. Cl.² ......................................... B65G 57/24
[58] Field of Search .......... 214/6 P, 6 DK, 6 G, 6 N, 214/6 A

[56] References Cited
UNITED STATES PATENTS

| | | | |
|---|---|---|---|
| 2,985,322 | 5/1961 | Parker............................. | 214/6 DK |
| 3,149,732 | 9/1964 | Gagnon et al. ..................... | 214/6 G |
| 3,381,828 | 5/1968 | Sheehan............................ | 214/6 P |

FOREIGN PATENTS OR APPLICATIONS

| 964,411 | 7/1964 | United Kingdom................. | 214/6 G |

Primary Examiner—Robert J. Spar
Assistant Examiner—Leslie J. Paperner
Attorney, Agent, or Firm—Willis Bugbee

[57] ABSTRACT

A pallet-supporting structure includes a vertical empty pallet magazine in which empty pallets are stacked and delivered one by one to an endless-belt slat conveyor which carries each pallet beneath an optional pallet cover sheet dispenser which in turn deposits a cover sheet of cardboard or other suitable material upon each pallet. The slat conveyor then moves the thus-covered pallet to a loading station beneath a bag stacker including a stacker-supporting structure mounted for movement laterally of the pallet-supporting structure. An elevator is mounted on said stacker-supporting structure and a carriage is mounted on said elevator for longitudinal movement toward and away from said pallet-supporting structure. A bag transfer conveyor is mounted on the carriage for longitudinal movement therewith and a bag turner is also mounted on said carriage adjacent said transfer conveyor for longitudinal movement with said carriage and is rotatable between a longitudinal position disposed in alignment with the transfer conveyor and a lateral position disposed transverse to said transfer conveyor. The bag turner has a bag discharge outlet therein and a closure movably mounted thereon. Hydraulic cylinders controlled by solenoidally-operated valves are provided for moving the stacker-supporting structure laterally, for moving the elevator vertically, for moving the carriage longitudinally, and for rotating the bag turner between its longitudinal and transverse positions.

15 Claims, 14 Drawing Figures

INVENTOR
ROBERT T. SHEEHAN

BY Barthel & Bugbee

ATTORNEYS

INVENTOR
ROBERT T. SHEEHAN
Barthel & Bugbee
ATTORNEYS

FIG.8A

BAG-TURNING STACKING PALLETIZER

In operation, filled bags placed on the bag transfer conveyor, which delivers them to the rotary bag turner whence the closure thereof opens to drop the bags upon the pallet beneath it either in a longitudinal or lateral position thereon. The bag turner, if in a lateral position, is then moved back into its longitudinal position to receive another bag. The stackersupporting structure is then moved laterally, the carriage moves longitudinally onto a position placing the outlet directly over the position desired for the second bag on the pallet, whereupon the closure again opens to drop the bag in that position. This continues until the bags have been deposited on the pallet in a desired pattern of three, four, five or seven bags, as needed. The elevator then rises and the foregoing movements are repeated to drop the bags in a predetermined pattern with the bags overlapping the junctions between the previously-laid first tier thereof so as to interlock the two layers and prevent sidewise slippage of the bags. The positioning and dropping of the bags continues in this manner with the elevator raising the carriage for each tier of bags until the desired number of tiers have been laid in bag-overlapping relationship to one another. The pallet conveyor then resumes operation to move the loaded pallet to a delivery station while at the same time moving an empty pallet with its optional cover thereon beneath the bag turner for the commencement of another bag-stacking operation.

GENERAL ARRANGEMENT

Figures 1, 11, 13:
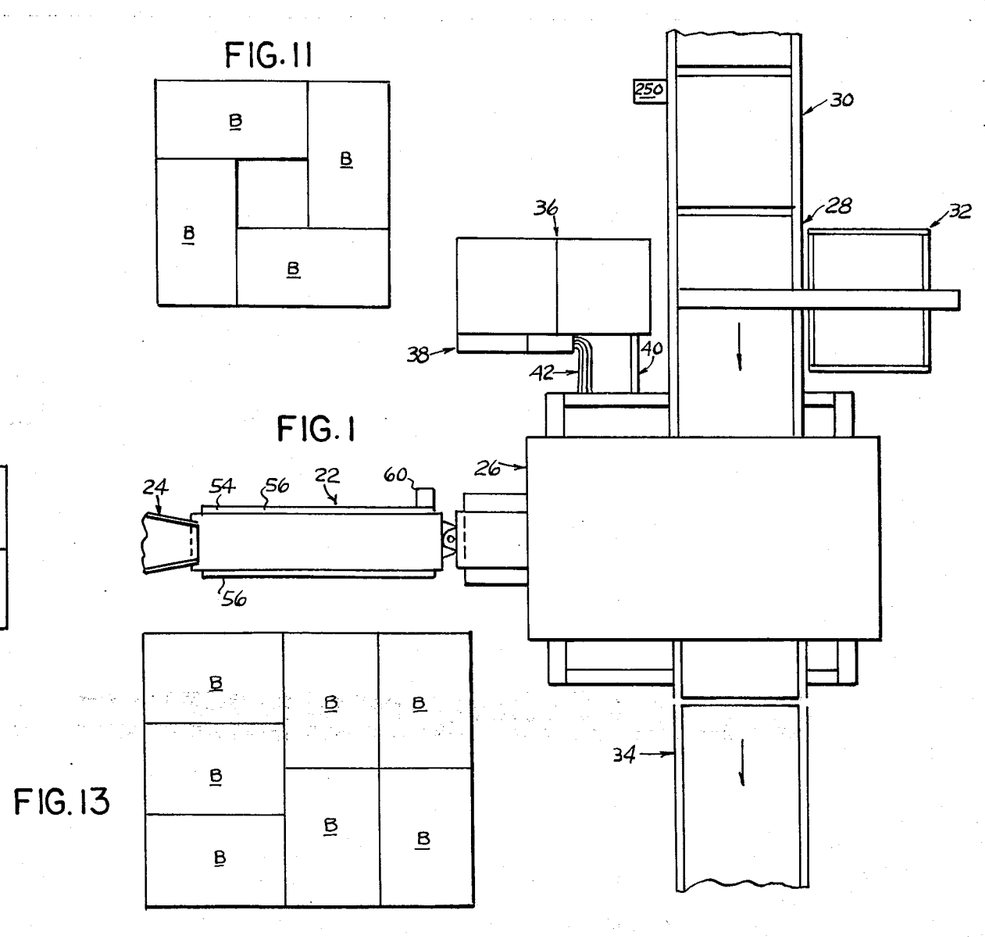
FIG. 1 is a diagrammatic top plan view, upon a reduced scale, of a bag-turning stacking palletizer showing the relative positions of the various units thereof.
FIGS. 11, 12 and 13 are top plan view of pallets loaded with bags stacked to even-numbered tiers of four-bag, five-bag and seven-bag patterns respectively.
Figure 2:
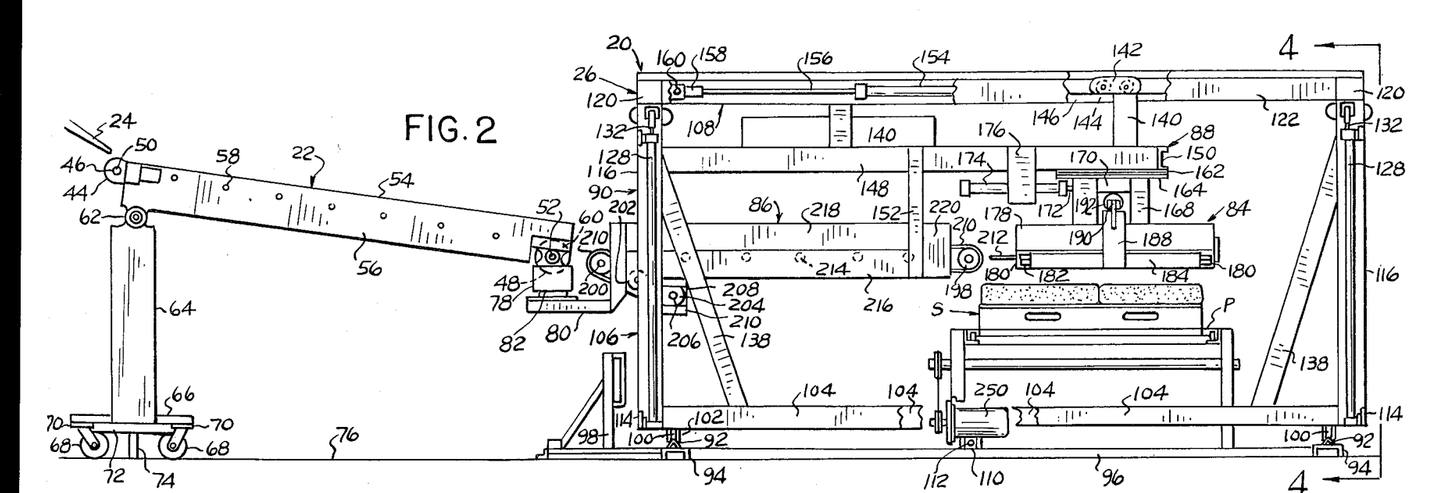
FIG. 2 is a side elevation of the palletizer with the electric wiring and hydraulic piping omitted for simplification.

Summarized briefly, (FIGS. 1 and 2), the bag-turning stacking palletizer, generally designated 20, of the present invention includes an intermittently-operable bag-feed-on conveyor 22, which receives the filled bags B one-by-one from a chute 24 constituting a filled-bag supply location, such as from a bag-filling machine (not shown) or from an external conveyor (also not shown). The bag-feed-on conveyor delivers the filled bags one-by-one to the inlet end of the bag transfer conveyor of a bag stacker, generally designated 26, coupled therewith (FIG. 2). The bag stacker 26 in turn conveys the filled bags, positions them either lengthwise or crosswise thereof, and drops them one-by-one either in a longitudinal position or in a transverse position upon an empty pallet P which is conveyed into a suitable bag-receiving position within the bag stacker 26 by an endless-belt slat pallet conveyor 28 from an empty pallet dispensser 30 by way of a pallet cover sheet dispenser 32. The pallet conveyor 28 operates intermittently in timed relationship with the bag stacker 26 to halt while stacking is in progress and to move onward to convey each loaded and stacked pallet P with its load of bags B into a loaded pallet receiver 34, while at the same time bringing an empty pallet beneath the stacker 26. The loaded stacked pallets P are removed by suitable conventional means such as by a conventional fork-lift truck (not shown) and conveyed to a place of further handling (not shown), such as a transport vehicle or a storage warehouse.

The filled bags B, if necessary, are flattened by a conventional flattener before being delivered to the bag-feed-on conveyor 22 so as to increase their stability with the result that as many as eight tiers of bags B may be loaded on a single pallet P without the danger of their toppling over. Furthermore, the loaded stacked pallets P may in turn be stacked upon one another within the warehouse so as to conserve storage space and thus reduce the cost of storage. As many as four six-tier pallets may be superimposed upon one another up to an overall height of sixteen feet by a high-loading fork-lift truck of sufficient lifting range. The hydraulic pressure fluid by which the various units of the bag-turning stacking palletizer 20 are operated is supplied from a suitable electric-motor-driven hydraulic power unit, generally designated 36, with a solid-state electrical control panel 38 and with hydraulic piping 40 and electrical control cables 42 respectively running therefrom to the previously-mentioned units of the palletizer 20. The bag-truning stacking palletizer 20 of the present invention stacks the bags B in different positions upon the pallets P according to different patterns for different numbers of bags per tier so that the bags of one tier overlap the junctions between the bags of adjacent tiers in order to prevent slippage therebetween and consequent toppling.

Bag-Feed-On Conveyor and Stacker Construction

The bag-feed-on conveyor 22 consists of an endless conveyor belt 44 (FIGS. 1 and 2) mounted on rearward and forward pulleys 46 and 48 rotating upon parallel axles 50 and 52 which in turn are mounted upon an elongated parallel-sided rectangular frame structure 54. Rotably mounted in the opposite side members 56 of the frame structure 54 are spaced parallel rollers 58 which rotatably support the upper course of the traveling endless conveyor belt 44. The forward or live axle 52 is driven by a hydraulic feed-on driving motor 60, preferably of the orbital gear type (FIG. 1). The rearward or upper end of the frame structure 54 is pivotally mounted at 62 on a vertical stanchion or upright 64, the lower end of which is mounted on a swivel support 66 adapted to move back and forth and also sidewise on caster wheels 68 carried by swivel forks 70 pivotally mounted on the support 66. The base 72 of the swivel support 66 contains a central elongated slot (not shown) extending between the forward and rearward caster wheels 68 and slidably engaging a post 74 which is anchored in the floor 76 of the room in which the palletizer 20 is located. As a result, the swivel support 66 can move forward or backward relatively to the post 74 and can also pivot thereon in accordance with the forward, backward or lateral motions of the bag-feed-on conveyor 22 in accordance with the lateral and longitudinal motions of the bag stacker 26.

Figure 3:
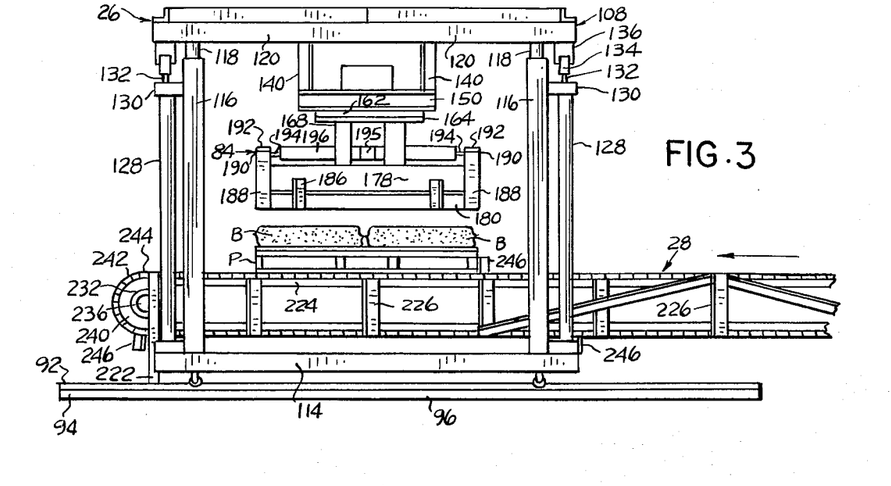
FIG. 3 is a front elevation of the bag stacker of the palletizer and adjacent portion of the pallet conveyor, similarly simplified, with the pallet guides removed and with the pallet dispenser and the cover sheet dispenser omitted to enable the disclosure to be made upon an enlarged scale.

A coupling 78 pivotally connects the forward end of the bag-feed-on conveyor to the bag stacker 26 by means of an L-shaped bracket 80, the horizontal part of which carries the inner part 82 of the pivotal coupling 78, whereas the vertical part is connected to the rearward end of a stacker carriage, generally designated 88 carrying a transfer conveyor, generally designated 86, and mounted for longitudinal motion within the stacker-supporting structure 90 of the bag stacker 26. The bag transfer conveyor 86 forms a part of the stacker carriage 88 which also includes a rotary bag turner, generally designated 84. The stacker-supporting structure 90 is movable laterally to-and-fro upon transversely-disposed V-rails 92 which in turn rest upon and are supported by inverted channel members 94 (FIGS. 2 and 3). These in turn are interconnected by laterally-spaced parallel longitudinal members 96, only one of which is shown in FIG. 2. Rising from the rearward ends of the longitudinal members 96 are uprights 98. Contact between the frame structure 90 and the V-tracks 92 is made by grooved wheels 100 rotatably mounted in wheel supports or yokes 102 secured to and depending from the spaced parallel longitudinal members 104 of the stacker-supporting structure 90.

The stacker-supporting structure 90 consists generally of a base structure 106 and a vertically-movable structure or elevator 108 mounted thereon. The base structure 106 is movable laterally to and fro upon the V-rails 92 by a hydraulic cylinder 110 having a piston head (not shown) therein and a piston rod 112 emerging from one end thereof to a connection at its outer end with one of the longitudinal members 104 intermediate the ends of the latter. The longitudinal members 104 at their opppsite ends are interconnected by transverse members 114 and from their junctions rise hollow columns 116 of rectangular cross-section (FIG. 3) containing vertically-slidable guide members 118 telescoping therewith. The slidable guide members 118 at their upper ends are connected to the cross members 120 of the vertically-movable structure 108, the opposite ends of the cross members 120 being interconnected by the londitudinal inwardly-facing channel members 122 thereof (FIG. 2).

Mounted on the corners of the base structure 106 are blocks 124 to which are secured the lower ends of four hydraulic cylinders 128 secured at their upper ends by brackets 130 to the hollow columns 116. Reciprocably mounted in the hydraulic cylinders 128 are piston heads (not shown) having piston rods 132 pivotally connected by coupling members 134 to yokes 136 secured to and depending from the four corners of the vertically-movable structure 108. As a result of this construction, when hydraulic pressure fluid is admitted to the lower ends of the hydraulic cylinders 128 and discharged from the upper ends thereof, the piston rods 132 rise, carrying with them the elevator 108, guided by the sliding guide motion of the inner guide members 118 sliding within the columns 116. Inclined brace members 138 connect the four hollow columns 116 to the longitudinal base structure 104 to strengthen the construction thereof. The vertical sliding motion of the inner members 118 is facilitated by rollers (not shown) secured to the outer members 116 within slots thereof, omitted from the drawings to simplify the disclosure.

The stacker carriage 88 is suspended from the upper longitudinal members 122 of the elevator 108 by forward and rearward upper hanger members 140, the upper ends of which are secured to cross members (not shown) which in turn are secured at their opposite ends of roller carries 142, the tandem rolers 144 of which roll on the lower flanges 146 of the inwardlyfacing longitudinal channel members 122. Connected to the lower ends of the hanger members 140 are laterally-spaced parallel longitudinal upper carriage members 148 interconnected at their opposite ends by lateral channel members 150 (FIG. 2). The bag transfer conveyor 86 is suspended from the upper members 148 by lower hanger members 152. The stacker carriage 88 is moved back and forth longitudinally along the channel members 122 by a hydraulic cylinderr 154 mounted thereon and containing a piston head (not shown) connected to a piston rod 156, the opposite end 158 of which is pivotally connected at 160 to the rearward cross member 120.

The bag turner 84 of the stacker carriage 88 depends from and engages the undersides of the longitudinal members 148 and forward cross member 150 through a stationary annularly-grooved circular guide plate or disc 162 below which runs an annularly-grooved rotary guide plate or disc 164 in which run multiple bearing balls for guiding the rotation of the bag turner 84. The latter is suspended by four posts 168 from the disc 164 and is rotatably supported from the upper disc 162 by an inverted T-shaped post 170, the vertical portion of which extends upward through a tapered roller bearing (not shown) mounted above and concentric with the upper bearing disc 162.

The bag turner 84 is rotated in opposite directions through an angle of 90 degrees by a piston rod 172 (FIG. 2) connected to a piston head (not shown) reciprocable within a double-acting hydraulic gate-rotating cylinder 174 pivotally mounted on a bracket structure 176. The piston rod 172 is pivotally connected to the bag turner 84 at a location eccentric to the axis of rotation thereof so as to have a rotary crank effect thereon so as to rotate the bag tuner 84 through an angle of 90 degrees forward and return.

The bag turner 84 includes a rectangular gate-supporting structure 178 carried by the lower ends of the four posts 168 and in turn having channel tracks 180 secured to their lower sides and facing toward one another. Running in the channel tracks 180 are pairs of rollers 182 mounted on the opposite ends of each of two horizontally-sliding plate-shaped gates 184, constituting a closure. The channel tracks 180 are secured to the gate-supporting structure 178 by angle cleats 186. The gates 184, of which there are two (only one being shown in FIG. 2), are movable simultaneously outward to discharge bags B by arms 188, the lower ends of which are secured rigidly to their respective gates at right angles thereto, while the upper ends are connected at 190 (FIG. 3) to clevises 192 on the ends of piston rods 194 entering the opposite ends of a double-ended hydraulic gate-operating cylinder 196, each being connected to one of a pair of oppositely-movable axially-spaced piston heads (not shown) within the hydraulic cylinder 196. As a consequence, hydraulic pressure fluid injected at the midpoint 195 of the hydraulic cylinder 196 and expelled from the opposite ends thereof causes the two piston rods 194 to move simultaneously outward away from one another, carrying with them the arms 188 and thereby causing the gates 184 to move outward away from one another so as to permit a bag B resting thereon to drop downward therebetween, as explained below in connection with the description of the operation of the invention.

The bag transfer conveyor 86 is provided with forward and rearward pulleys 198 and 200 respectively and (FIG. 2) rotatably mounted at the forward and rearward ends respectively thereof. Mounted adjacent and below the rearward pulley 200 in downwardly and forwardly-spaced relationship therewith are a loose pulley 202 and a drive pulley 204, the latter being mounted on the output shaft 206 of a hydraulic stacker-belt driving motor 208, also preferably of the orbital-gear type. The latter is mounted on brackets 210 secured to and depending from the transfer conveyor 86. Trained over and around the pulleys 198, 200, 202 and 204 is an endless transfer conveyor belt 210 which receives the filled bags B one-by-one from the feed-on conveyor 22. The endless belt 210 deposits the bags upon the bag transfer plate or shelf 212 connected to and carried by the gat-supporting structure 178 on a level with the gates 184. This shelf 212 permits the bags B to slide thereacross onto the gates 184 as each bag is ejected from the endless belt 210 above the forward pulley 198 of the transfer conveyor 86.

The upper course of the endless transfer conveyor belt 210 is supported and guided upon freely-rotatable rollers 214 (FIG. 2) journaled in the opposite sides of the rectangular supporting frame 216 of the transfer conveyor 86. Secured to the rectangular frame 216 and rising therefrom are laterally-adjustable side members or bag guide plates 218 which are movable laterally in accordance with the sizes of the bags being stacked. An end member 220 secured to the forward end of the rectangular frame 216 of the bag transfer conveyor 86 serves to interconnect the forward ends of the guide plates 218 as well as to support the forward pulley 198 of the conveyor 86.

Pallet Conveyor Construction

Resting upon and rising from the floor 76 are the supporting uprights 222 of the endless-belt slat pallet conveyor 28, the uprights 222 being interconnected by horizontal angle members 224 (FIGS. 3 and 4) which serve as tracks for rollers 225 on the opposite ends of the slats 224 and which in turn are interconnected by vertical members 226. The forward portion of the slat conveyor 28 is disposed within the bag stacker 26 so that it will carry the empty pallets P beneath the bag turner 84. Its rearward end is disposed beneath the empty pallet dispenser 30 while adjacent the latter is mounted the pallet cover sheet dispenser 32, as shown in FIG. 1 but omitted from FIG. 4 in order to simplify the disclosure. The pallet conveyor 28 is provided at the opposite ends of its supporting frame, generally designated 230, with bearing blocks 232 which rotatably support the horizontal axles or shafts 234 or 236 of pulleys 238 and 240 respectively which support an endless slat belt 242 (FIG. 4) consisting of laterally-extending pivotally interconnected slats 244.

Figures 4, 5:
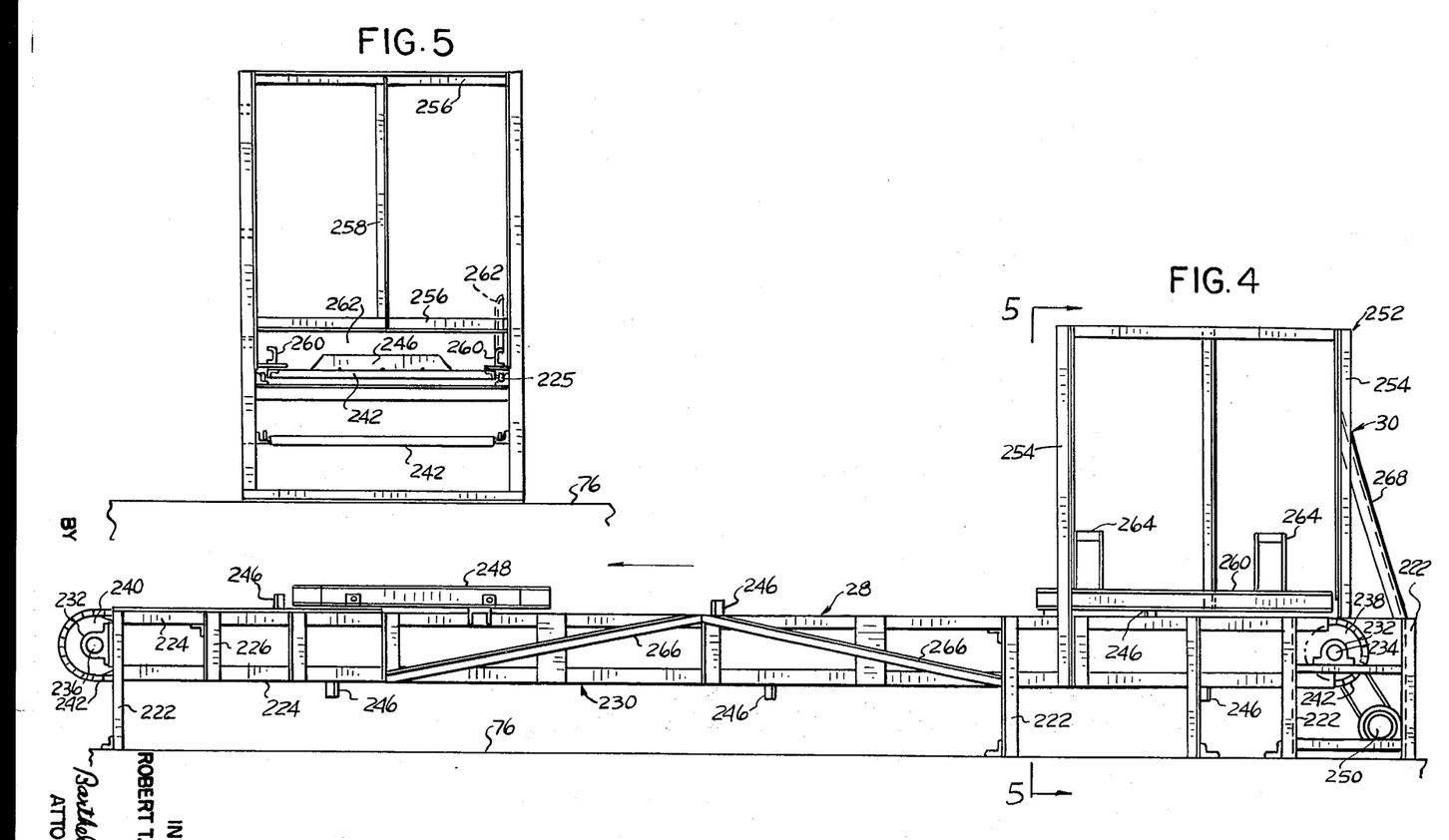
FIG. 4 is a front elevation of the pallet dispenser, cover sheet dispenser and the entire pallet conveyor, which supply covered pallets to the bag-stacking unit of FIGS. 2 and 3, with the pallet guides in place.
FIG. 5 is a section taken along the line 5—5 in FIG. 4, showing the pallet dispenser in front elevation, with the pallet conveyor omitted for simplification of the disclosure.

Secured at equally-distant intervals along the endless slat belt 242 are six outwardly-projecting cleats 246. These cleats 246 are engage pallets P in the empty pallet dispenser 30 and push them along until they arrive beneath the bag stacker 26, where they are accurately guided into position by a pair of spaced parallel horizontal pallet guide members 248, only one of which is shown in FIG. 4. The endless slat belt 242 of the pallet conveyor 28 is driven by a rotary hydraulic motor 250 (FIG. 2) drivingly connected to the shaft 236 to move the slat belt 242 intermittently to halt the empty pallet P between the guide members 248 while palletizing of the bags B is being carried out.

Pallet Dispenser Construction

The pallet dispenser 30 (FIGS. 4 and 5) includes an upright framework or pallet magazine 252 composed of four upright angle members 254 secured to and rising from the horizontal members 224. The upper ends of the uprights 254 are interconnected by angle cross members 256 (FIG. 5) which on three sides (the fourth side being open) are interconnected by vertical intermediate angle members 258. The forward or left-hand lower cross member 256 (FIG. 5) is spaced above a pair of laterally-spaced parallel horizontal pallet guide members 260 in order to provide a rectangular opening 262 through which but one pallet at a time can be expelled by one of the cleats 246 on the pallet conveyor 28. Vertical guides 264 on the fourth (and open) side of the pallet magazine 252 direct the lowermost pallets of the stack of pallets into proper registry with the slat conveyor 242 and horizontal guide members 260. Inclined braces 266 and 268 are secured to and extend between the respective frame structures of the pallet conveyor 28 and pallet dispenser 30.

Pallet Cover Sheet Dispenser Construction

The optional pallet cover sheet dispenser 32 (FIGS. 6 and 7) as shown in FIG. 1 (but omitted from FIG. 5 because optional,) is mounted on a rectangular framework, generally designated 270, consisting of four corner uprights 272 interconnected by upper and lower horizontal members 274. An additional cross member 276 extends between the forward or righthand uprights 272 in FIG. 6. This cross member 276 serves not only to support an L-shaped stop 278 but also to carry a pivot bracket 280 which at 282 pivotally supports the lower end of a vertical hydraulic pallet cover lift cylinder 284, from the upper end of which emerges a piston rod 286 with a clevis 288 secured at the midpoint of an angle member 290 welded or otherwise secured to the cover sheet supporting plate or platform 292. The latter at its forward edge has an upstanding wall portion 294. Secured to its rearward edge is a pivot rod 296, the opposite ends of which are mounted in pivot bearing blocks 298 secured to the rearward uprights 272. The hydraulic cylinder 284 raises and lowers the cover sheet supporting plate 292 with its stack of pallet cover sheets S of any convenient material, such as corrugated cardboard, which are fed to the empty pallets P by the cover sheet dispenser 32 where such cover sheets are desirable or necessary.

The cover sheets S are picked off the top of this stack (FIG. 6) one-by-one by a vacuum cup feeder, generally designated 300. The feeder 300 includes a framework 302 including a bottom member 304 and opposite upstanding pairs of space end members 306 and 308 between the tops of which extend a horizontal stationary guide rod 310. The forward pair of uprights 306 intermediate their upper and lower ends are provided with a slide guide bearing 312 whch slidably engages a sliding guide rod 314, the rearward or left-hand end of which is secured to a rearward cross head 316 bored at its upper end to snugly but slidably engage the guide rod 310. Secured to the forward end of the sliding guide rod 314 is a depending forward cross head 318, to the lower end of which is secured a tubular cross bar or manifold 320. Mounted at the opposite ends of the cross bar 320 are the tubular stems 322 of vacuum cups 324 formed of elastic deformable material, such as natural or synthetic rubber or flexible synthetic plastic.

Secured to the forward cross head 318 between its upper and lower ends is te piston rod 326 of a horizontal hyraulic cover-dispensing cylinder 328 within which its piston head (not shown) is reciprocable. The hydraulic cylinder 328 is greatly elongated an rests upon the bottom member 304 of the framework 302. Omitted from FIG. 6 in order to avoid concealing the stack of cover sheets S but shown in FIG. 7 are two spaced parallel side plates 330 which are secured at their lower edges of the pallet cover sheet supporting plate 292 for maintaining the cover sheets S in proper vertical alignment. Mounted on and extending between the lower horizontal members 274 on opposite sides of the framework 270 is a shelf 332 which supports a vacuum pump 334 driven by an electric motor 336 and connected by a flexible hose (not shown) to the manifold 320. The vacuum pump 334 runs constantly but the vacuum cups 324 exert a suction gripping effect only when the stack of cover sheets S has been raised by the hydraulic cylinder 284 until the topmost sheet S engages the vacuum cups 324. Upon descent of the supporting plate 292 in response to the reversal of the hydraulic cylinder 284, the topmost cover sheet S remains gripped at its forward end by the suction of the vacuum cups 324, which drag it off the stack and onto a waiting empty pallet in response to a forward stroke of the hydraulic cylinder 328, and drops thereon upon the breaking of the vacuum, as explained below in the description of the operation of the invention.

Hydraulic System

Figure 8A:
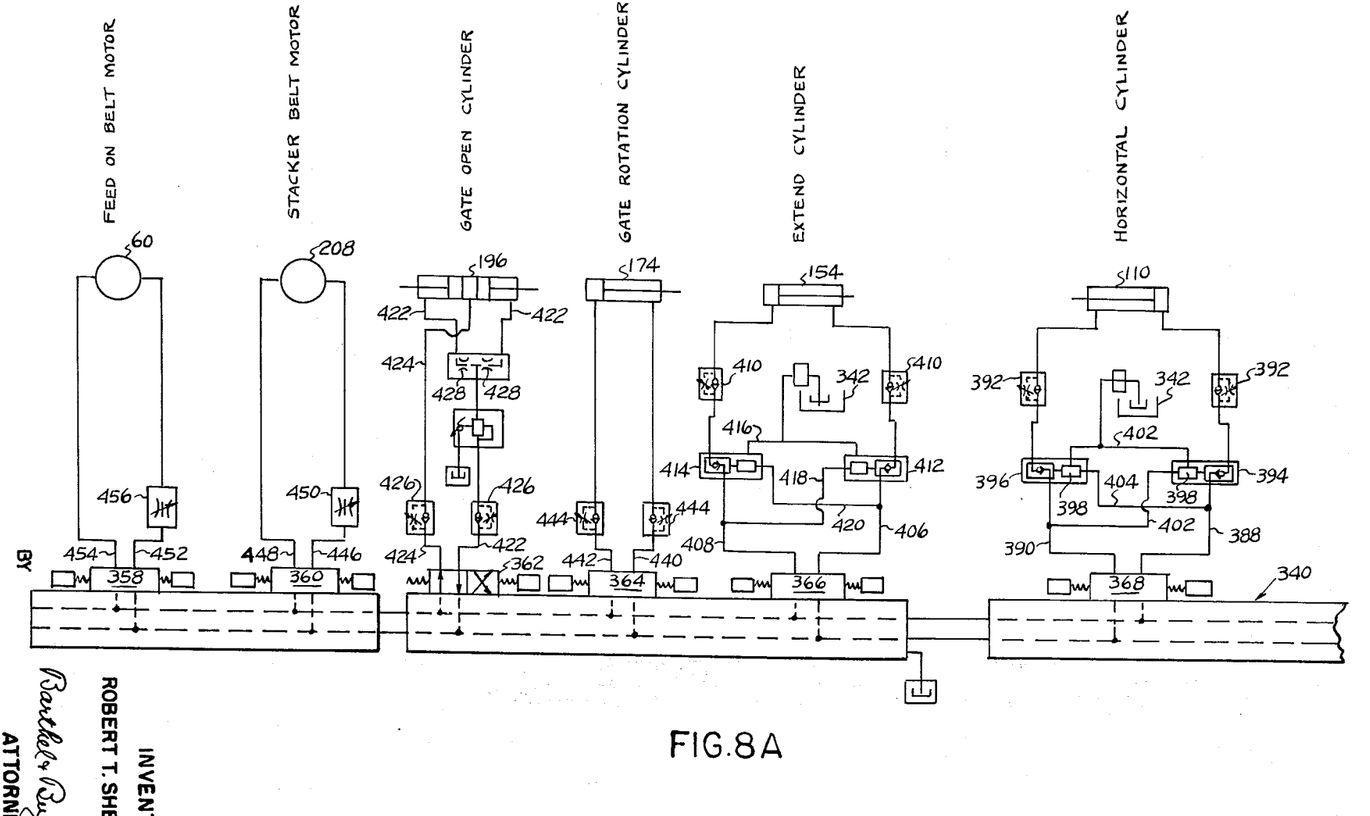
FIG. 8A is a circuit diagram of approximately one-half of the hydraulic circuit employed in actuating the palletizer of FIGS. 1 to 6 inclusive.
Figures 8B, 9:
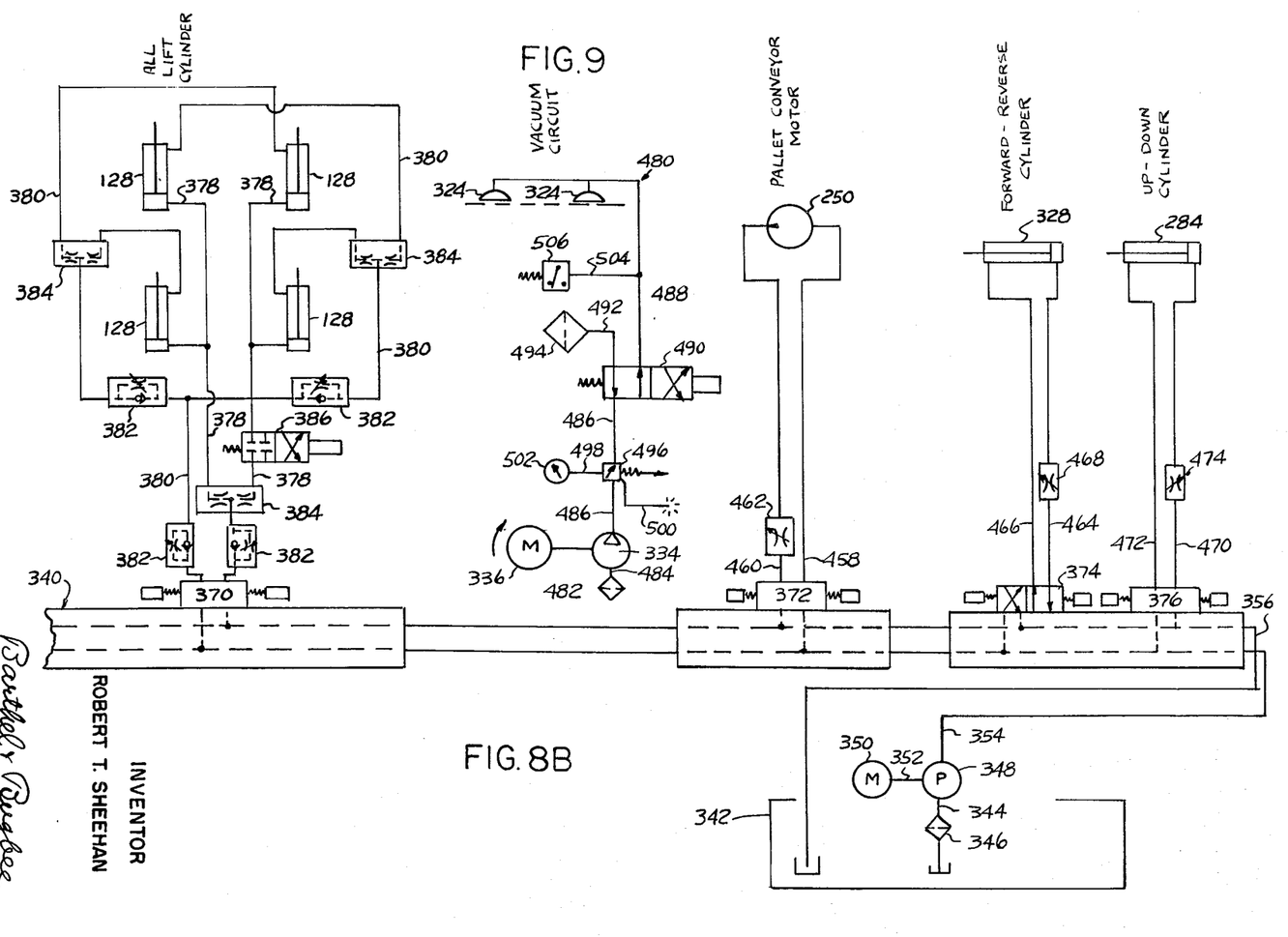
FIG. 8B is a circuit diagram of the other half of said hydraulic circuit, the two circuits being incapable of being shown on a sufficiently large scale on a single sheet of drawings.
FIG. 9 is a circuit diagram of the vacuum circuit employed for lifting and transferring the pallet cover sheets in the pallet cover sheet dispenser.

The hydraulic system, generally designated 340, for bringing about the various motions of the bag-turning palletizer 20 is shown in the two drawing sheets containing FIGS. 8A and 8B, which should be considered as a single figure because of the inability of placing the entire system upon a single sheet of drawings. The hydraulic system 340 is supplied with hydraulic pressure fluid from the hydraulic power unit 36 (FIG. 8B) which includes a hydraulic fluid tank 342 within which a hydraulic suction line 344 equipped with a strainer 346 and leading to the suction port of a hydraulic pump 348 driven by an electric motor 350 through a shaft 352. From the pressure port of the hydraulic pump 348, a pressure fluid supply line 354 runs to the various units of the hydraulic circuit 340, from which units a hydraulic fluid return line 356 carries hydraulic fluid back to the tank 342. In the palletizer 20 as actually constructed, the lines 354 and 356 run respectively to and from a series of manifolds disposed at various convenient locations and interconnected by other fluid lines. For simplicity of disclosure, however, the lines 354 and 356 have been shown as single conduits running the entire length of the system.

The pressure fluid supply line 354 runs to the inlet ports of ten conventional solenoidally-operated four-way control valves 358, 360, 362, 364, 366, 368, 370, 372, 374 and 376, all of which are operated in both directions by solenoids and centered by springs to neutral or no-delivery positions except the valve 362 which in one direction is spring-operated. These fourway valves are well-known to those skilled in the hydraulic art, available on the open market and their details are beyond the scope of the present invention.

From the elevator control valve 370 (FIG. 8B), pressure fluid supply and fluid return lines 378 and 380 respectively run to opposite ends of the four reciprocating boom lift cylinders 128 by way of conventional adjustable throttle valves 382 equipped with bypass check valves and throttle valves for speed regulation. The lines 378 and 380 are also equipped with throttle valves 384 lacking check valves. The pressure fluid supply line 378 leading to the two forwardly-disposed cylinders 128 is additionally equipped with a solenoid-operated valve 386. The above-mentioned valves in the return lines 380 serve as flow dividers adapted, during operation, to compensate for the variable load imposed on the forward and rearward pairs of lift cylinders 128 by the backward and forward motion of the stacker boom 88 and its load. In particular, one flow divider controls the fluid flow from the rear pair of lift cylinders 128, a second flow divider controls the fluid flow from the forward pair of lift cylinders, and a third flow divider takes fluid from both pairs of lift cylinders 128 in such a manner as to insure that the same volume of fluid is discharged from all lift cylinders 128 regardless of the varying pressure resulting from the varying load during operation.

The hydraulic cylinder 110 which moves the base structure 106 horizontally to and fro laterally along the V-rails 92 is controlled by the solenoid-operated valve 368 (FIG. 8A) which is supplied with pressure fluid and returned through service lines 388 and 390, each of which is equipped with an adjustable throttle valve 392 provided with a bypass check valve and also with hydraulically-opened check valves 394 and 396, the operating cylinders 398 of which are interconnected on their return sides by a return line 400 leading back to the fluid reservoir 342, whereas their pressure sides are oppositely-connected by lines 402 and 404 to the service lines 390 and 388 respectively.

The longitudinal stacker carriage moving cylinder 154 (FIG. 8A) is controlled by the solenoid-operated valve 366 through service lines 406 and 408, each of which is equipped with an adjustable throttle valve 410 provided with a bypass check valve and also with hydraulically-opened check valves 412 and 414 similar to the check valves 394 and 396 and similarly having their return side interconnected by a return line 416 leading back to the fluid reservoir 342, whereas their pressure sides are oppositely connected by lines 418 and 420 to the service lines 408 and 406 respectively.

The gate-operating cylinder 196 is controlled by the spring-returned solenoidal valve 362 (FIG. 8A) through service lines 422 and 424 which contain adjustable throttle valves 426 with bypass checck valves therein. The service line 424 is connected to the central port of the double-ended hydraulic cylinder 196 to operate the two pistons thereof simultaneously in opposite directions, whereas the opposite end ports thereof afe connected through throttle valves 428 in the service line 422 back to the control valve 362 by way of the adjustable throttle valve 426 therein.

The gate-rotating cylinder 174 is controlled by the control valve 364 through service lines 440 and 442 containing adjustable throttle valves 444 with bypass check valves therein. The stacker belt-driving motor 208 is controlled by the flow control valve 360 through service lines 446 and 448, the former containing an adjustable throttle valve 450. The feed-on belt driving motor 60 is similarly controlled by the control valve 358 through service lines 452 and 454, the former containing an adjustable throttle valve 456 (FIG. 8A).

The pallet conveyor driving motor 250 (FIG. 8B) is controlled by the control valve 372 through service lines 458 and 460, the latter of which contains an adjustable throttle valve 462. The horizontal hydraulic pallet-cover-dispensing cylinder 328 is controlled by the control valve 374 through service lines 464 and 466, the former of which contains an adjustable throttle 468. Similarly, the vertical hydraulic pallet cover lift cylinder 284 is controlled by the control valve 376 through service lines 470 and 472, the former of which contains an adjustable throttle valve 474.

Vacuum Circuit for Pallet Cover Dispenser

Figure 6:
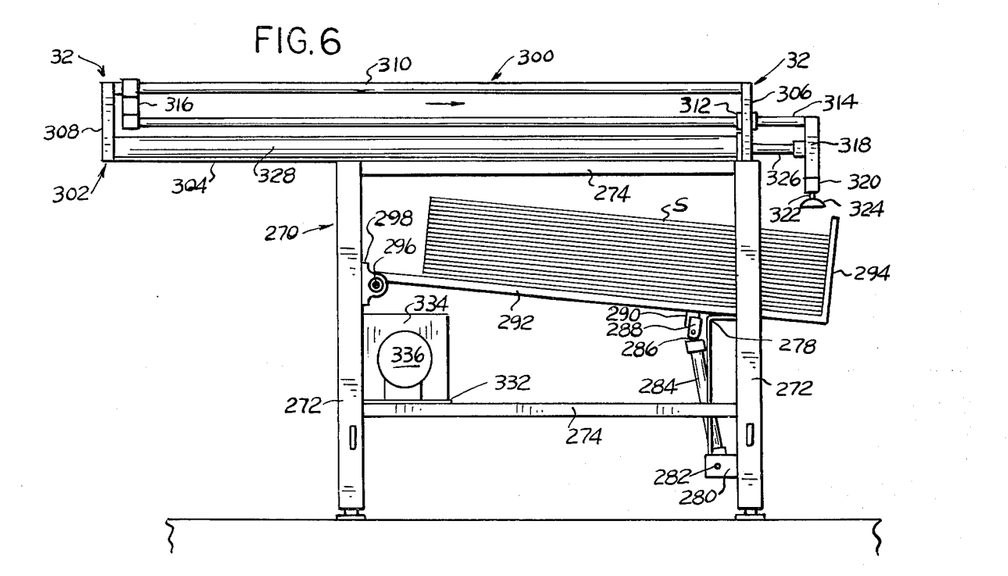
FIG. 6 is a side elevation of the optional cover sheet dispenser for optionally supplying a cover sheet to each pallet.
Figure 7:
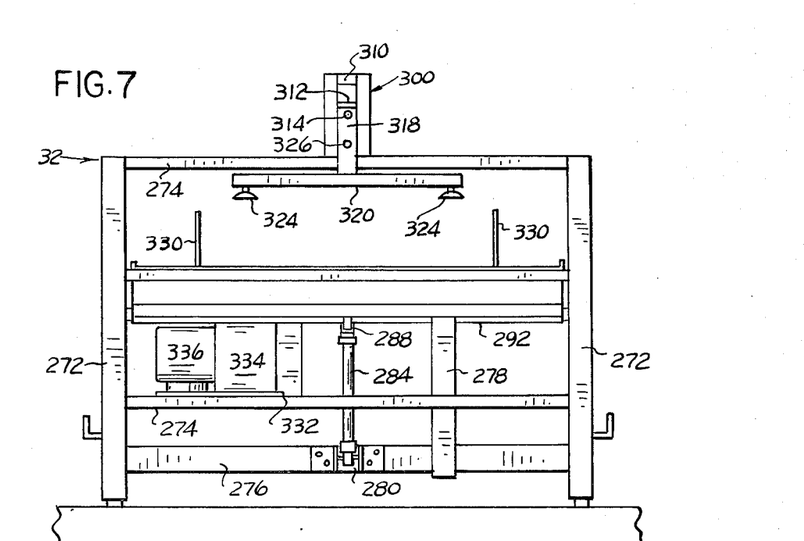
FIG. 7 is a right-hand end elevation of the cover sheet dispenser shown in FIG. 6.

The vacuum circuit, generaly designated 480 (FIG. 9) actuates the vacuum cups 324 for intermittently picking up the pallet cover sheets S and releasing them on the pallets P in the pallet cover dispenser 32 (FIG. 6). The vacuum pump 334 driven by the electric motor 336 discharges air through the filter or strainer 482 by way of the discharge line 484 and receives air through the suction lines 486 and 488 by way of a solenoid-operated valve 490 which in its alternate position takes in air through an air intake line 492 by way of filter or strainer 494. Also connected to the suction line 486 by way of a valve 496 with side lines 498 and 500 is a vacuum indicating gauge 502. Connected by way of a side line 504 to the suction line 488 is a 506.

Operation

Figure 10:
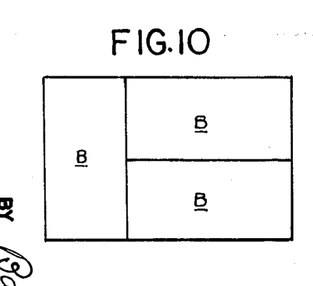
FIG. 10 is a top plan view of a pallet loaded with bags stacked to an even-numbered tier of a three-bag pattern.
Figure 12:
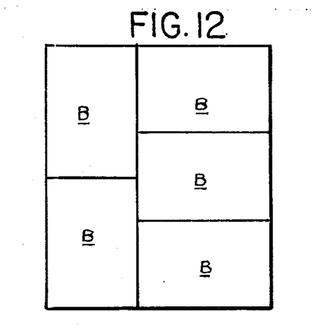

In the bag-turning stacking palletizer 20 as actually constructed, the various motions of the moving parts are controlled by limit switches (not shown) which in turn are connected into a complex solid-state electro-hydraulic circuit containing timing devices such that the various motions of the machine are carried out automatically in timed relationship to one another and in a predetermined sequence for a selected bag pattern determined by the manual pre-setting of the circuit controls. In FIG. 10 there is shown the disposition of the bags B on the pallet P in a three-bag pattern, in FIG. 11 the arrangement for a four-bag pattern, in FIG. 12 for a five-bag pattern and in FIG. 13 for a seven-bag pattern. Moreover, the circuit is programmed for carrying out the particular bag-laying in overlapping tiers, and the energization of the various solenoids of the solenoid-operated hydraulic control valves 358 to 376 inclusive, as well as that designated 386 (FIG. 8B) and the vacuum-controlled valve 490 (FIG. 9) is controlled by the above-mentioned limit switches. Furthermore, in the actual stacking operation of each tier of bags, a memory circuit determines when the bag turner 84 is to be turned and when it is to remain stationary during the laying of each tier of bags. When it is turned cross-wise, however, it is always turned back to its longitudinal position to receive the next bag, A memory or counting circuit also closes a circuit to shift the stacker carriage 88 to the next higher level when a tier of bags has been laid, and in an overlapping disposition of bags. The electrical circuit also contains a limit switch which shuts down the machine when the supply of empty pallets in the pallet dispenser 30 becomes depleted to the point where there would be no pallet available for the reception of the bags B when the gates of the bag turner 84 again open. The electrical circuit referred to above for actuating the various elements of the hydaulic circuit 340 of FIGS. 8A and 8B and the vacuum circuit 480 of FIG. 9 is unavoidably complicated and, in order to simplify the disclosure, has been omitted. It will be evident that the various switches for controlling the various solenoidally-operated control valves mentioned above could be actuated manually in timed relationship, and for the purpose of simplifying the explanation of the operaton of the invention, such manual switch operation will be assumed.

Before operating the palletizer 20 of the invention, let it be assumed that a supply of empty pallets P has been piled in a stack within the pallet magazine 252 (FIGS. 1, 4, and 5) and that a three-bag pattern for filled bags B is to be stacked in overlapping tiers upona pallet P. Let it also be assumed that each empty pallet P is provided with a cover sheet of cardboard or other suitable material from the pallet dispenser 32 before the pallet reaches the bag stacker 26. Accordingly, the operator places a stack of such cover sheets S upon the cover sheet supplrting plate 292 (FIG. 6). The operator also starts the vacuum pump motor 336 (FIGS. 6 and 9) and the hydraulic pump motor 350 (FIG. 8B) so as to exhaust air from the vacuum cups 324 (FIG. 9) and supply hydraulic pressure fluid, such as hydraulic oil under pressure, to the pressure fluid supply line 354 (FIG. 8B) and thence to the various control valves 358 to 376 inclusive. When the respective control valves 358 and 360 of the hydraulic motors 60 and 208 of the feed-on conveyor 22 and bag transfer conveyor 86 respectively are suitably shifted, pressure fluid is supplied to these motors 60 and 208. Let it also be assumed that the base structure 106 and the stacker carriage 88 have been moved to such locations initially that the gates 184 are suitably positioned above the pallet guides 248 so as to drop the first bag B in the desired position upon the pallet P as shown in FIG. 10 for the three-bag pattern.

The solenoidal valve 372 is now actuated electrically to cause rotation of the hydraulic pallet conveyor motor 250 which then causes the endless slat conveyor belt 242 to move in an orbital path around its respective pulleys 238 and 240, carrying its six cleats 246 along with it. When the cleat 246 nearest the empty pallet magazine 252 (FIG. 4) passes beneath the rearward ends of the pallet guides 260, it engages the rearward end of the lowermost pallet P in the stack within the empty pallet magazine 252 and moves it out from beneath that stack in a horizontal path terminating between the pallet guides 248 (FIG. 4) beneath the bag turner 84, whereupon one of the cleats 246 actuates a limit switch (not shown) which reverses the control valve 372 and consequently halts the pallet conveyor motor 250 and pallet conveyor 242 while bag stacking or "palletizing" takes place, as described below.

Meanwhile, a filled bag B, previously flattened if desirable or necessary, has been delivered by the chute 24 to the feed-on conveyor 22, the belt 44 of which conveys it to the bag transfer conveyor 86, the belt 210 of which in turn conveys it to the bag transfer plate or shelf 212, whereupon the conveyors 22 and 86 halt momentarily, and the bag B by its own momentum slides forward over the plate or shelf 212 onto the now-closed gates 184. In particular, a limit switch (not shown) then opens the electrical circuit to the control valves 358 and 360 of the feed-on and stacker conveyor motors 60 and 208, shifting these valves to their neutral positions and halting their respective conveyor belts 44 and 210. Concurrently with the halting of the conveyor belts 44 and 210, the solenoid-operated control valve 362 opens to supply pressure fluid to the double-ended gate-operating cylnder 196, shifting its respective pistons and piston rods 194 away from one another in opposite directions (FIG. 3), thereby causing the gates 184 to move outward away from one another so as to open, whereupon the first bag B of the three-bag pattern is dropped in the longitudinal position shown at the left-hand end of FIG. 10. The solenoidal valve 362 is then de-energized and spring-shifted into its reverse position to supply pressure fluid reversely to the gate-operating cylinder 196 and thereby close the gates 184.

The solenoid-operated control valve 368 is now shifted to supply pressure fluid to the lateral base structure moving cylinder 110, causing it to move the base structure 106 of the stacker-supporting structure 90 laterally (to the right in FIG. 10) while at the same time the solenoid control valve 366 is activated to supply pressure fluid to the longitudinal stacker carriage moving cylinder 154 (FIG. 8A), moving it such that the bag turner 84 when rotated will come to rest over the right-hand corner bag position of FIG. 10 on the pallet P. During these occurrences another filled bag B has been delivered by the chute 24 and thence to the transfer conveyor 86, which conveyors momentarily resume operation to deliver the bag B to the now longitudinally-disposed closed gates 184 of the bag turner 84. The solenoidal control valve 364 is then operated to supply pressure fluid to the bag-turner rotating cylinder 174, causing its piston rod 172 to rotate the bag turner 84 ninety degrees into a transverse position. The solenoidal control valve 362 is now operated to again open the gates 184, dropping the second bag B in a position transverse to the first-dropped bag B and located in the upper righthand corner of FIG. 10.

The solenoidal control valve 362 is now again reversed to close the gates 184 while at the same time the solenoidal control valve 364 is likewise reversed to reverse the motion of the bag turner rotating cylinder 174 and swing the bag turner 84 back into its longitudinal bag-receiving position in alignment with the bag transfer conveyor 86. Meanwhile, the third bag has been received from the chute 24, conveyed by the feed-on conveyor 22 and bag transfer conveyor 86 which have momentarily resumed operation, in time to transfer the third bag across the shelf 212 onto the now-closed longitudinally-positioned gates 184, whereupon the conveyors 22 and 86 again halt momentarily. At the same time, the solenoidal control valve 366 has been operated to supply hydraulic pressure fluid to the longitudinal carriage-moving cylinder 154 to move the stacker carriage 88 forward while the solenoid control valve 364 has again been shifted to cause the bag-turner rotating cylinder 174 to rotate the bag turner 84 with the third bag aboard, so that the gates 184 again are disposed in a transverse position but directly above the position intended for the third bag, namely in the lower right-hand corner of FIG. 10. The solenoid control valve 362 is now operated to supply pressure fluid to the double-cylinder 196 to open the gates 184, dropping the third bag in its transverse position parallel to the second bag and perpendicular to the first bag, as shown in FIG. 10. This completes the laying of the first tier of bags in a three-bag pattern, ready for the laying of the second tier of baags on the pallet pin overlapping relationship with the first tier. The solenoidal control valve is now again reversed to cause the double-ended cylinder 196 to again close the gates 184.

The solenoidal control valve 370 (FIG. 8B) is now operated to supply pressure fluid to the lines 378 running to the lower ends of the vertical lift cylinders 128, causing their piston rods 132 to lift the elevator 108 by an amount greater than the thickness of a filled bag, carrying with them the stacker carriage 88, together with the bag transfer conveyor 86 and bag turner 84. At the same time, the coupling 80 raises the forward end of the bag feed-on conveyor 22 to maintain it in alignment with the bag transfer conveyor 86. During the foregoing movements of the bag stacker 26 and bag feed-on conveyor 22, the stanchion 66 supporting the rearward end of the bag feed-on conveyor 22 moves back and forth or swings sidewise by the reaction between its swivel carriage 66 and the stationary post 74 in sliding engagement with the elongated slot (not shown) in the base 72 of the swivel support 66.

In the meantime, with the gates 184 now closed by the gate-opening cylinder 196 and the bag turner 84 rotated back into alignment longitudinally with the bag transfer conveyor 86 in the manner described above, a fourth bag has been delivered by the conveyors 22 and 86 to the bag turner 88, the gates 184 of which now lie immediately above the right-hand end of the three-bag pattern of FIG. 10. The conveyors 22 and 86 again halt momentarily. The gate-operating cylinder 196 is again operated by the solenoidal valve 362 to open the gates 184 and drop the fourth bag in a longitudinal position parallel to the first bag B but spaced to the right of it in the bag pattern of FIG. 10 and overlapping the junction between the transversely-disposed second and third bags of the first tier. The gates 184 are then closed in their longitudinal positions by the reverse operation of the gate-operating cylinder 196 in response to reversal of the solenoidal valve 362. A fifth bag is now delivered from the chute 24 by the re-started feed-on conveyor 22 and transfer conveyor 86 to the bag turner 84, whereupon the conveyors 22 and 86 again halt momentarily and the bag turner rotating cylinder 174 is again operated in response to the shifting of the solenoidal valve 364 to rotate the bag turner 84 so as to dispose its gates 184 in a transverse position, while at the same time the longitudinal carriage moving cylinder 154 and the lateral base structure moving cylinder 110 are actuated in response to the shifting of their respective solenoidal control valves 366 and 368 to move the stacker carriage 88 rearwardly and at the same time move the base structure 106 of the stacker-supporting structure 90 laterally to bring the gates 184 into a transverse position overlying the junction between the longitudinal first bag and the transverse second bag in the upper right-hand corner of FIG. 10, whereupon the solenoidal valve 362 is operated to actuate the gate-operating cylinder 196 and open the gates 184, dropping the fifth bag in overlapping transverse relationship with the first and second bags of the first tier. The solenoidal valve 362 is then reversed to reverse the gate-operating cylinder 196 and close the gates 184 while at the same time the solenoidal valve 364 is reversed to rotate the bag turner 84 from its transverse position back to its longitudinal position ready to receive the sixth bag.

The sixth bag is now delivered from the chute 24 by the re-started conveyors 22 and 86 to the now longitudinally-disposed bag turner 84, whereupon the conveyors 22 and 86 are again momentarily halted by the halting of their respective hydraulic motors 60 and 208, and the longitudinal carriage-moving cylinder 154 is again operated by the shifting of its solenoidal control valve 364 to move the stacker carriage 88, bag turner 84, bag transfer conveyor 86 and feed-on conveyor 22 forward while the solenoidal valve 364 is again operated to rotate the gates 184 of the bag turner 84 into transverse position. The solenoidal valve 362 is then shifted to operate the gate-operating cylinder 196 to open the gates 184 and drop the sixth bag into a transverse position in the lower left-hand corner of the three-bag pattern of FIG. 10, overlapping the hunction between the first and third bags of the first tier thereof, and completing the laying of the second tier.

The foregoing cycle of operation then repeats itself, again depositing three bags in succession, one after another, to form a third tier with the bags B thereof disposed in vertical alignment with those of the first tier, hence overlapping the junctions between the bags of the second tier, and so on for as many tiers as it is desired to lay. This overlapping of the bags in successive tiers in effect ties the successive tiers of bags together by their weight and frictional interengagement, thereby preventing them from sliding relatively to one another and sonsequently preventing toppling over the stack of palletized bags finally obtained.

When the stacker carriage 88, turner 84, elevator 108 and base structure 106 have moved in co-operation with one another in the above described manner to lay the required number of tiers of bags, a limit switch (not shown) re-energizes the solenoidal valve 372 to restart the pallet conveyor motor 250 and move the now stacked pallet P to the left in the direction of the arror in FIG. 4 off the pallet conveyor 28 and onto the conventional receiving conveyor (not shown) at the left-hand end of FIG. 4, whence it is removed by a fork-lift truck or other suitable conventional means, either to a waiting transport vehicle, such as a truck, railway freight car, ship or transport aricraft, or into a storage warehouse, as the case may require, This temporary operation of the pallet conveyor 28 in removing the loaded pallet P at the same time ejects another empty pallet from the pallet magazine 252 by the action of the nearest arriving cleat 246, whereupon the repetition of the above-described cycle of operations causes the pallet cover sheet dispenser 32 to again deposite a cardboard cover sheet S upon the empty pallet while a pallet just covered is moved at the same time between the horizontal pallet guides 248 and beneath the bag stacker 26, ready for the depositing of the next load of bags in successively overlapped tiers, as described above. For simplicity of description and clearness of understanding, the loading of an empty pallet P with a three-bag pattern (FIG. 10) in multiple overlapped tiers has been described above. The palletizer 20, however, by reason of its universal motions is equally well adapted and consequently programmed for laying the four-bag pattern of FIG. 11, the five-bag pattern of FIG. 12 or the seven-bag pattern of FIG. 13 by varying the sequence of co-operative movements of the carriage 90, the stacker boom 88 and the bag turner 84.

With the bag-turning stacking palletizer 20 as actually constructed in accordance with the present disclosure, for example, it has been found possible in actual practice to stack more than forty bags per minute in eight tiers of a seven-bag pattern (FIG. 13) with successive tiers overlapped to prevent toppling. This machine also effects a great saving of time, space and labor by eliminating the necessity for the handling of individual bags, as has been previously necessary in loading transport vehicles such as trucks, freight cars, ships or aircraft. The loaded pallets can be safely stacked one upon another in a warehouse by the use of a high-rise fork-lift truck. Whether or not forcible flattening of the filled bags is necessary or advisable depends upon the nature of the material therein. A bag containing granular material will tend to flatten itself because of the relative motions of the granules therein. Particles of powdered material, however, possess so much frictional engagement with one another that they do not move easily relatively to one another and therefore must be forcibly flattened if flattening is deemed advisable under the particular circumstances. The bag turning stacking palletizer 20 described herein is equally well adapted to the handling of bags made of various materials, such as, for example, of burlap, paper or synthetic plastic.

I claim:

1. A bag-turning palletizer, comprising
 a pallet-supporting structure disposed at a bag-stacking station,
 and a bag stacker disposed adjacent said pallet-supporting structure at said bag-stacking station and including
  a base structure mounted for movement laterally of said pallet support structure,
  an elevator mounted on said base structure for upward and downward movement relatively to said base structure,
  a stacker carriage mounted on said elevator for longitudinal movement thereon toward and away from said pallet-supporting structure,
  a bag-transfer conveyor mounted on said carriage for longitudinal movement therewith,
  a bag turner rotatably mounted on said carriage adjacent said transfer conveyor for longitudinal movement with said carriage and rotatable between a longitudinal position aligned with said transfer conveyor and a lateral position transverse to said transfer conveyor,
  said bag turner having a bag discharge outlet and a closure movably mounted thereon for travel into the out of closing relationship with said bag outlet,
  power-operated means for moving said base structure laterally of said pallet-supporting structure,
  power-operated means for moving said elevator upward and downward relatively to said base structure, power-operated means for moving said carriage longitudinally of said elevator, power-operated means for actuating said transfer conveyor, and power-operated means for rotating said bag turner between said longitudinal and transverse positions thereof.

2. A bag-turning palletizer, according to claim 2, wherein said power-operated means include hydraulic motors and electrically-actuated valves connected thereto for controlling said hydraulic motors, and wherein said prime mover includes a power-driven generator of hydraulic pressure fluid hydraulically connected to said valves.

3. A bag-turning palletizer, according to claim 2, wherein the bag transfer conveyor is an endless belt conveyor, and wherein the power-operated means for actuating the same is a rotary hydraulic motor.

4. A bag-turning palletizer, according to claim 1, wherein the pallet-supporting structure includes an endless belt pallet conveyor.

5. A bag-turning palletizer, according to claim 4, wherein a rotary hydraulic motor is operatively connected to said pallet conveyor, and wherein said prime mover includes a power-driven generator of hydraulic pressure fluid hydraulically connected to said rotary hydraulic motor.

6. A bag-turning palletizer, according to claim 1, wherein the bag transfer conveyor and the bag turner are mounted on said carriage in depending relationship thereto.

7. A bag-turning palletizer, according to claim 4, wherein an empty pallet magazine adapted to hold a stack of empty pallets is disposed in communication with said pallet conveyor, and wherein said pallet conveyor includes means thereon for detachably engaging the lowermost pallet of the stack for conveying the detached pallet to said bag-stacking station.

8. A bag-turning palletizer, according to claim 7, wherein a pallet sheet cover dispenser is disposed adjacent said pallet conveyor and between said empty pallet magazine and said bag stacking station and includes mechanism for detaching a pallet sheet cover from a stack thereof in said dispenser and for depositing the detached sheet cover on the detached pallet on said pallet conveyor.

9. A bag-turning palletizer, according to claim 8, wherein said detaching and depositing mechanism includes a suction device, a vacuum pump operatively connected to said suction device, and means for moving the stack of sheet covers and said suction device relatively to one another into engagement with one another.

10. A bag-turning palletizer, according to claim 9, wherein said last-mentioned means includes a cover sheet support and a hydraulic cylinder operatively connected to said support for raising and lowering said support.

11. A bag-turning palletizer, according to claim 1, wherein said elevator-moving power-operated means includes forward and rearward pairs of vertical hydraulic cylinders having lift pistons therein operatively connected to said elevator and disposed in outwardly-spaced relationship to said carriage, and wherein said prime mover includes a power-driven generator of hydraulic pressure fluid.

12. A bag-turning palletizer, according to claim 12, wherein said prime mover also includes an electrically-operated control valve and a hydraulic circuit connecting said control valve to said vertical hydraulic cylinders, and also includes a flow-divider connected to each pair of said cylinders, and a flow-divider connected between said pairs of cylinders.

13. A bag-turning palletizer, according to claim 1, wherein a bag feed-on conveyor is coupled to said bag transfer conveyor, and wherein a swivel-wheel-equipped support is connected to said bag-feed-on conveyor remote from its coupling with said bag transfer conveyor.

14. A bag-turning palletizer, according to claim 12, wherein said support has an elongated slot therein, and wherein a stayionarily-anchored post is disposed in relatively sliding engagement with the edges of said slot.

15. A bag-turning palletizer, according to claim 13, wherein said bag feed-on conveyor is an endless belt conveyor, wherein a rotary hydraulic motor is drivingly connected to said last-mentioned conveyor, and wherein said prime mover includes a power-driven generator of hydraulic pressure fluid hydraulically connected to said rotary motor.

* * * * *